United States Patent
Katayama et al.

(10) Patent No.: US 6,285,464 B1
(45) Date of Patent: Sep. 4, 2001

(54) APPARATUS AND METHOD FOR PRODUCING A HALF-TONE IMAGE

(75) Inventors: Akihiro Katayama, Kawasaki; Hidefumi Ohsawa, Kawaguchi; Akiko Fukuhara, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 07/957,825

(22) Filed: Oct. 8, 1992

Related U.S. Application Data

(62) Division of application No. 07/875,210, filed on Apr. 28, 1992, now Pat. No. 5,325,448, which is a continuation of application No. 07/270,809, filed on Nov. 14, 1988, now abandoned.

(30) Foreign Application Priority Data

Nov. 16, 1987 (JP) .................................................. 62-289152
Nov. 16, 1987 (JP) .................................................. 62-289170

(51) Int. Cl.$^7$ ............................. H04N 1/21; H04N 1/40; H04N 1/417; G06K 9/36
(52) U.S. Cl. ..................... 358/298; 358/456; 358/459; 358/261.2; 358/466; 382/232
(58) Field of Search ............................. 358/298, 261.2, 358/430, 445, 448, 443, 456, 459, 465, 468; 382/50, 54, 56, 51, 52, 53, 232; 341/51, 94

(56) References Cited

U.S. PATENT DOCUMENTS

| | | |
|---|---|---|
| 498,127 | 5/1893 | Levy . |
| 1,790,722 | 2/1931 | Ranger . |
| 4,012,584 | 3/1977 | Gascoigne .............................. 358/302 |
| 4,386,366 * | 5/1983 | Mori ...................................... 358/456 |
| 4,449,150 * | 5/1984 | Kato ....................................... 358/135 |
| 4,561,025 | 12/1985 | Tsuzuki .................................. 358/298 |
| 4,574,357 | 3/1986 | Pastor et al. .......................... 364/518 |
| 4,651,287 | 3/1987 | Tsao ...................................... 364/519 |
| 4,654,721 | 3/1987 | Goertzel et al. ....................... 358/283 |
| 4,680,645 | 7/1987 | Dispoto et al. ........................ 358/298 |
| 4,692,811 | 9/1987 | Tshuchiya et al. .................... 358/282 |
| 4,707,745 | 11/1987 | Sakano .................................. 358/283 |
| 4,841,374 | 6/1989 | Kotani et al. .......................... 358/280 |
| 4,901,363 | 2/1990 | Toyokawa .............................. 382/56 |
| 4,933,776 | 6/1990 | Ikeda ..................................... 358/456 |
| 4,956,718 | 9/1990 | Numakura et al. .................... 358/298 |
| 5,055,942 | 10/1991 | Levien ................................... 358/456 |

FOREIGN PATENT DOCUMENTS

| | | | |
|---|---|---|---|
| 3433493 * | 4/1985 | (DE) | ................................ H04N/1/40 |
| 57-104369 | 6/1982 | (JP) | ................................ H04N/1/40 |

OTHER PUBLICATIONS

Ulichney, *Digital Halftoning*, pp. 279–283, MIT Press, 1987.

Nikkei Electronics, *Special LST for Converting Graduated Images More Smoothly Than Other Methods Have Been Developed*, Nov. 18, 1985 (with translation).

Floyd and Steinberg, *An Adaptive Algorithm for Spatial Grayscale*, Proceedings of the S.I.D., vol. 17/2, 2nd Quarter, 1976.

G.S. Fawcett et al., "Halftoning Techniques Using Error Correction", Proceeings in the SID, vol. 27.4, pp. 305–308 (1986).

* cited by examiner

Primary Examiner—Peter S. Wong
Assistant Examiner—Gregory J Toatley, Jr.
(74) Attorney, Agent, or Firm—Fitzpatrick, Cella, Harper & Scinto

(57) ABSTRACT

A half-tone image is produced by scanning a plurality of input points of an original, outputting a screened image having a plurality of black and white dots and transmitting signals representing the screened image to a marking device. The size of each plurality of dots is determined from a recursive relationship between a value of a current input point, a previous output and an error representing a difference between a value of a previous input point and the previous output.

21 Claims, 13 Drawing Sheets

APPARATUS AND METHOD FOR PRODUCING A HALF-TONE IMAGE

This application is a division of application Ser. No. 07/875,210, filed Apr. 28, 1992, now U.S. Pat. No. 5,325, 448 which is a continuation of application Ser. No. 07/270,809, filed Nov. 14, 1988, now abandoned.

BACKGROUND OF THE INVENTION

1. Field of the Invention

The present invention relates to an image treatment method and apparatus for treating images with digital signals. More particularly, the present invention relates to an image treatment method and apparatus for expressing half-tone images in a pseudo-manner by performing a quantization treatment of input data.

2. Related Background Art

Apparatuses of the type described, above such as laser beam printers (LBP) and ink jet type printers employing a binary recording method in which recording dots are treated as "printed or not" are known. When a copying treatment of images of half-tone density, such as photographs or half-tone dot original documents, is performed with a copying machine which employs the above-described binary recording method, a method is employed in which a treatment for expressing a half-tone in a pseudo-manner is used, the read-out half-tone image data being treated using an image treatment circuit.

As an example of the method of treatment of the above-described type of pseudo-half-tone treatment, there is, at present, a so-called "dither method" which is the method widely used.

This dither method has an advantage that the above described type of pseudo-half-tone processing can be performed with a low cost since the structure of the hardware is simple. However, this method raises the following problems:

(1) In the case where the original document is a dot image such as a print, the quality of the image deteriorates due to generation of periodical fringes (moiré patterns) in the copied image; new (2) In the case where the original document contains line drawings and/or characters, sufficient reproductivity of the lines cannot be obtained, and the quality of the image deteriorates.

There is a method of overcoming problem (1) by performing a smoothing treatment (spatial filtering treatment) upon the read-out half-tone image data. Furthermore, there is a method of overcoming problem (2) by performing an edge exaggerating treatment. However, with the above-described methods, it is difficult to obtain images exhibiting a sufficient productivity upon all various images such as photographs, dot images, line drawings, and characters. Furthermore, the size of the circuit for performing the above-described treatment is larger. Therefore, the original advantages of the dither method can deteriorate.

To improve on this, as an example of a pseudo-half-tone treatment, there is a so-called "error diffusion method" which has recently attracted public attention.

This error diffusion method is a method in which the error in the density, which is generated when the input image data is binarized, between that of the input (not yet binarized) image data and that of the output (binarized) image data is diffused to the peripheral picture elements whereby the density can be secured. This method was published in "An Adaptive Algorithm for Spatial Grey Scale," SID 75 Digest, literature by R. W. Floyd and L. Steinberg.

This error diffusion method exhibits a rather improved gradating performance and resolution with respect to the above-described dither method. However, this method raises problems that a specific fringe pattern can be generated in a portion where the density of the image is uniform, and/or granular noise can appear due to generation of dots in a diffused manner in highlight portions of the image.

In order to overcome these problems, a variety of methods have been disclosed in U.S. patent application Ser. Nos. 137,439, 140,029 and 192,601 and in U.S. Pat. Nos. 5,008, 950, 4,876,610 and 4,878,125.

Furthermore, a method is disclosed in U.S. patent application Ser. No. 203,880, in which the generation of lines at the boundary portions of the images is prevented when the image is divided into a plurality of regions and the thus-divided regions are each quantization-treated in the error diffusion method.

On the other hand, when an original image is read and it is binarized by the error diffusion method so as to be output by a printer, there is a problem that there is a blank area in which no dot is printed as shown in FIG. 15 if the density of the original image is in a low level. Furthermore, in the region next to such blank region, dots are, as shown in FIG. 15, printed successively. As described above, the reproduced image output after treatment using the error diffusion method raises the problem that excessive deterioration in the quality of image is generated in the highlight portion in which the density of the image is in a low level.

SUMMARY OF THE INVENTION

An object of the present invention is to provide an image treatment method and apparatus capable of overcoming the problems experienced with the conventional methods and apparatuses and further capable of reproducing the image exhibiting high grade and excellent accuracy.

A further object of the present invention is to provide an image treatment method and apparatus capable of reproducing the highlight portion of the image well when the input data is treated using an error diffusion method.

Another object of the present invention is to provide an image treatment method and apparatus capable of reproducing an image exhibiting an excellent quality with a simple structure.

A still further object of the present invention is to provide an image treatment method and apparatus in which a reference value is determined at the time of quantizing image data and the image data is quantized using an error diffusion method depending upon the thus-determined referential value.

The other object of the present invention is to provide an image treatment method and apparatus wherein whether there is a dot printed in the region in which treatment has been performed in the periphery of the subject picture element or not is determined, and this subject picture element is quantized using an error diffusion method in accordance with the result of the determination.

DETAILED DESCRIPTION OF THE PREFERRED EMBODIMENTS

First, the cause for deterioration in image quality in the highlight portion of the image described in the prior art will be described prior to the description of embodiments of the present invention.

Figure 15:
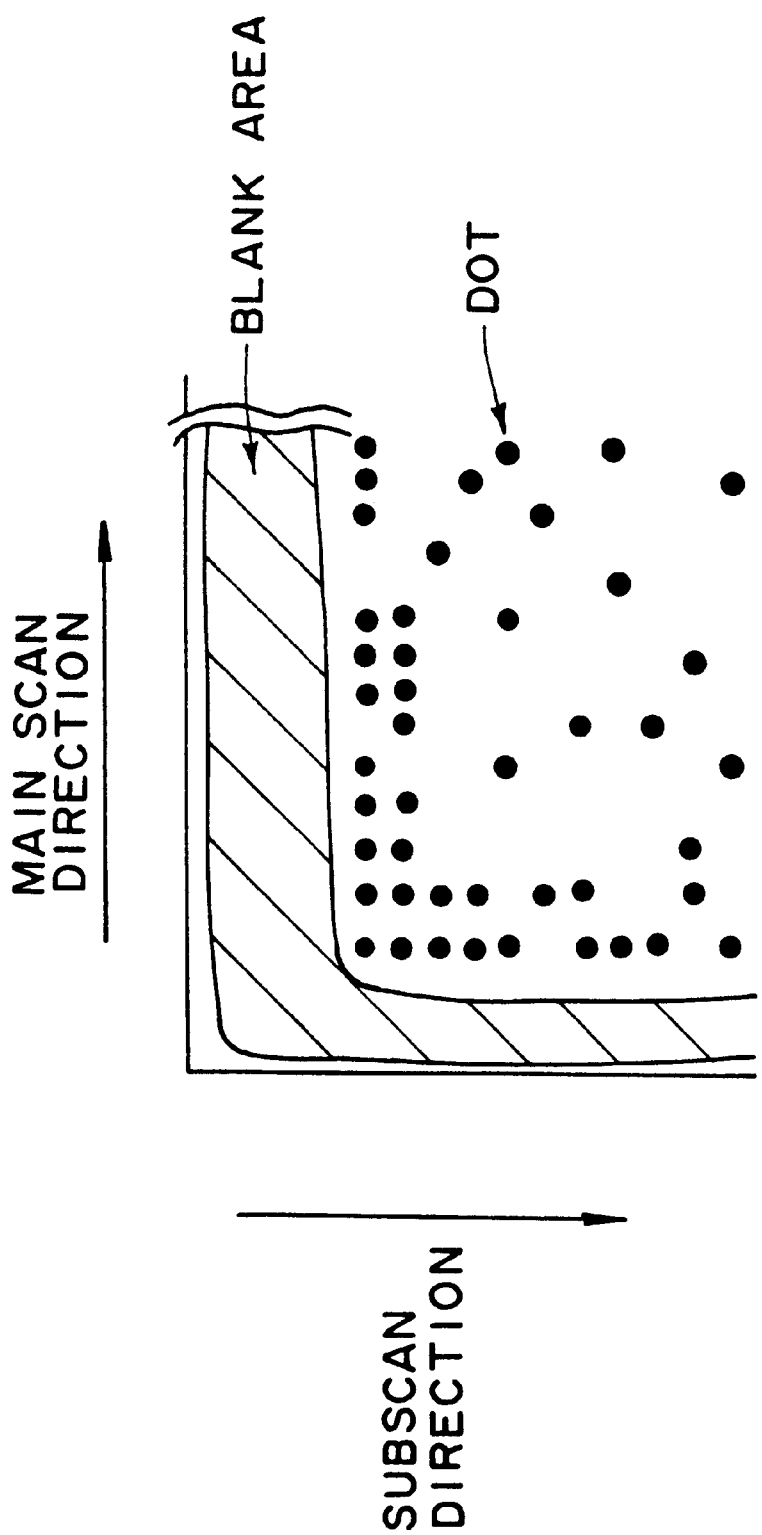
FIG. 15 is a view illustrating the problem experienced with the conventional treatment.

The causes for the printing of extraneous dots in a region in which the density of the image is low can be considered to be as follows:

The error diffusion method is a method of performing a successive quantization of input images by diffusing the quantization error between the density of the input image and the same of the output image to the as yet non-treated picture elements. However, when the portion in which the density of the image is in a low level is binarized in the error diffusion method, the positive error gathered in the subject picture element can be made in a low level since the position error is diffused, at the time of binarization, to the periphery portion is in the low level. As a result of this, it is difficult to make the density of the subject picture element exceed the threshold value (when the input image is 8 bits=256 levels, the threshold value is usually 127) in the binarization. As a result of this, a portion in which no dot is printed can be generated, as shown in FIG. 15.

Furthermore, the cause of generation of the successive dots can be considered as follows. The errors generated in the blank areas shown in FIG. 15 and generated at the time of binarization become positive values since the density of the input image is low. Furthermore, since these positive errors are diffused to the region next to the blank area, dense generation of the dots occurs in this area.

Then, an embodiment of the present invention capable of preventing the dot blank phenomenon in the highlight portions of the image due to the above-described cause or the phenomenon in which dots are successively generated, will be described.

First Embodiment

A first embodiment of the present invention will now be described with reference to the accompanying drawings.

Figure 1:
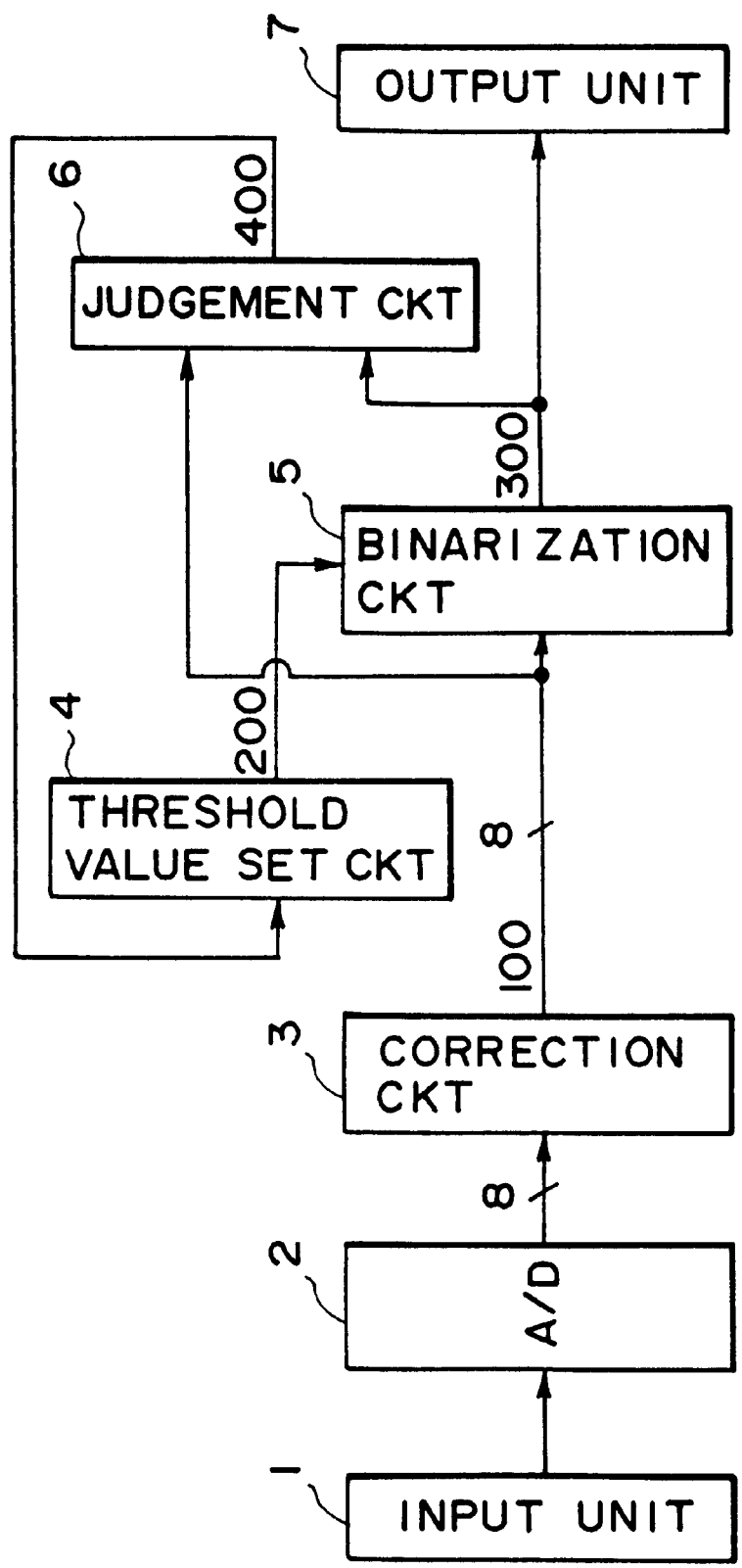
FIG. 1 is a block diagram for use in a first embodiment of the present invention.

FIG. 1 is a block diagram of circuitry used in an image treatment apparatus according to a first embodiment of the present invention.

Image data read out by an input device 1 comprising a phototransducing element such as a CCD and a driving system for scanning the same are successively supplied to an A/D converter 2. In this A/D converter 2, data upon each of the picture elements are converted to, for example, digital data of 8 bits. As a result of this, the image data is quantized to 256-gradations data. Next, a correction such as shading correction for correcting for nonuniform sensitivity of the sensor or for nonuniform illuminance due to the power source for illumination is performed in a correction circuit 3 in a digital calculation treatment. Then, a signal 100 which has been subjected to the above-described correction is input to a binarization circuit 5 and a judgment circuit 6. In a threshold value setting circuit 4, the threshold for realizing the binarization is set in response to a judgment signal 400 output from the judgment circuit 6 so that a threshold signal 200 is output. In the binarization circuit 5, the corrected signal 100 output from the correction circuit 3 is binarized by the threshold value signal 200 output from the threshold value setting circuit 4 so that a binary signal 300 is output therefrom. In the judgment circuit 6, by using the binary signal 300 output from the binarization circuit 5 and the corrected signal 100 output from the correction circuit 3, the binarized regions in the periphery of the subject picture element to be binarized are made reference for the purpose of performing a determination whether there is a dot which has been turned on or not. As a result of this, a judgment signal 400 is output. An output device 7 comprises a laser beam printer or ink jet printer and performs an image formation of the binary signal 300 output from the binarization circuit 5 by way of turning on/off of the dots.

Figures 2, 4:
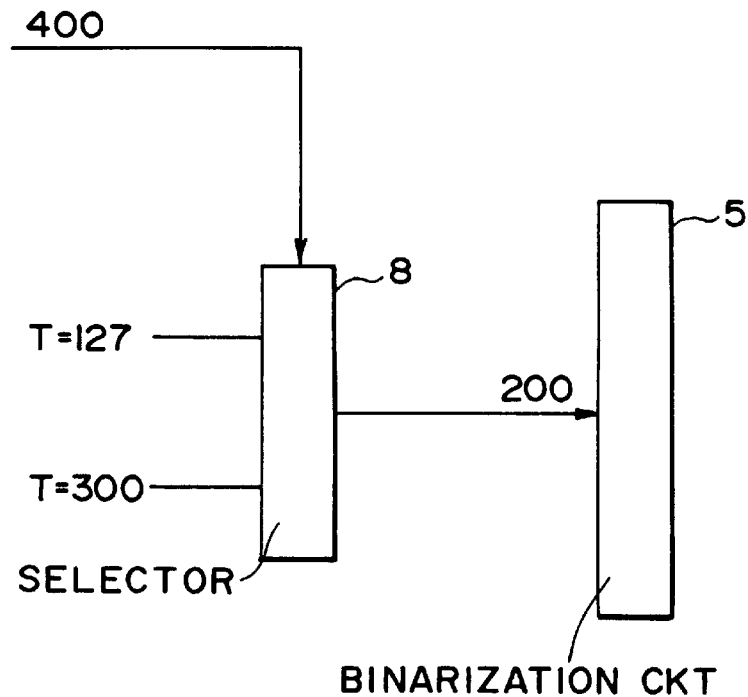
FIG. 2 is a block diagram illustrating in detail a threshold value setting circuit 4.
FIG. 4 is a view illustrating an example of a weight coefficient.

FIG. 2 is a block diagram illustrating in detail the threshold value setting circuit 4.

The judgment signal 400 output from the judgment circuit 6 is input to a selector 8. The selector 8, in response to the judgment signal 400, selects a threshold value T1=300 when the judgment signal 400 is "1", while the same selects a threshold value of T2=127 when the judgment signal 400 is "0" so that the threshold signal 200 is output.

When the judgment signal 400 is "1", the threshold T1=300 is selected since it is a highlight portion of the image and furthermore a dot is present in the peripheral portion of the subject picture element so that the successive printing of the dots is prevented.

Although T1=300 in this case, the level of the value T1 only needs to exceed the maximum value of the corrected signal 100. Furthermore, while T2=127 in this case, it can be set to another value.

Figure 3:
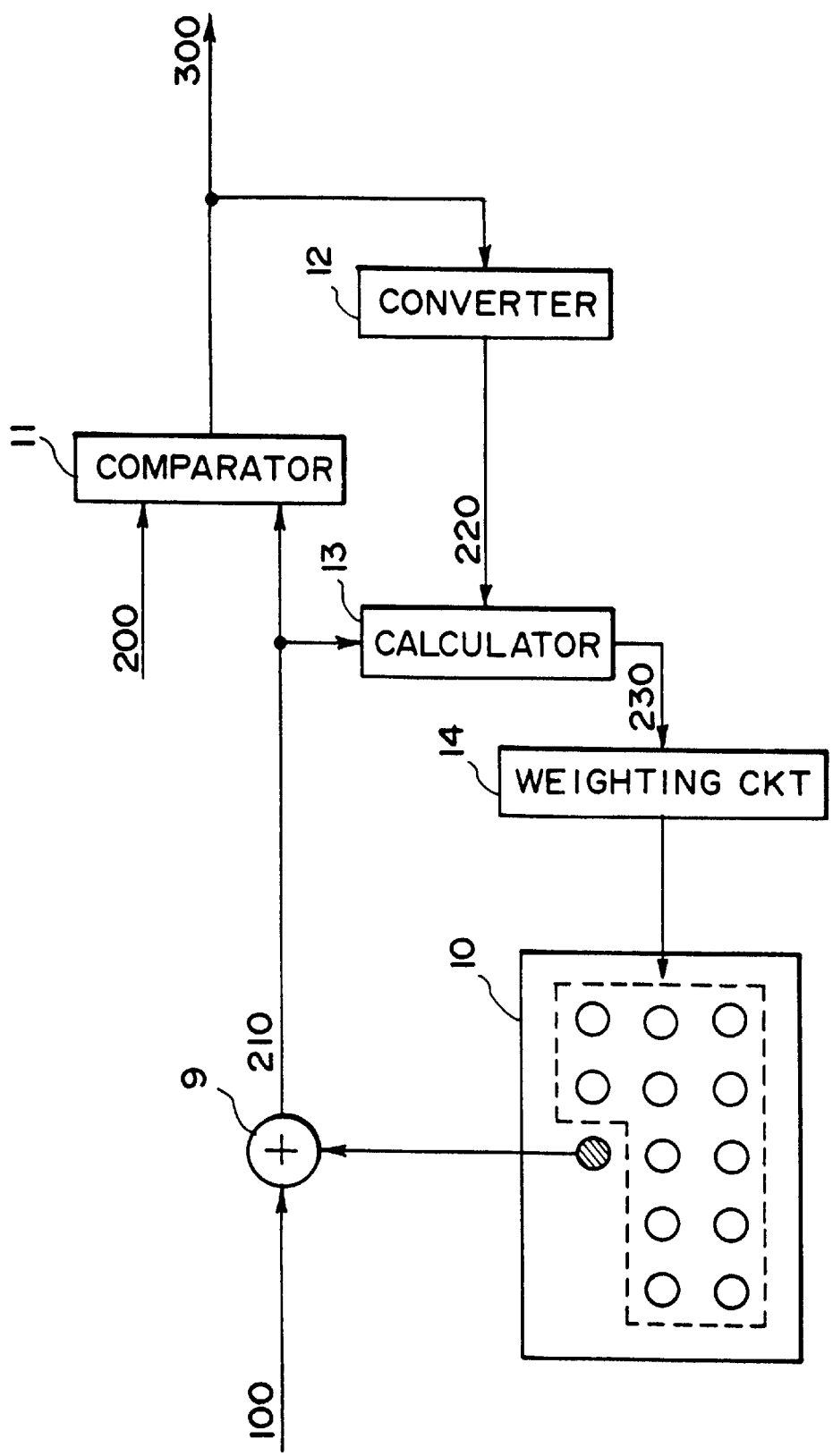
FIG. 3 is a block diagram illustrating in detail a binarization circuit 5.

FIG. 3 is a block diagram illustrating in detail the binarization circuit 5. The corrected signal 100 (the density of the subject picture element) output from the correction circuit 3 is added to the error $E_{ij}$ (the total sum of the errors distributed from the peripheral picture elements to the subject picture element) stored in an error buffer memory 10 by an adder 9. As a result of this, an error corrected signal 210 is output.

The error corrected signal 210 is input to a comparator 11 wherein it is compared with the threshold signal 200. If the error corrects signal 210 is greater than the threshold signal 200, "1" is output, while, the same is smaller than the threshold signal 200, "0" is output as the binary signal 300. on the other hand, in a converter 12, if the thus-input binary signal 300 is "0", the value as it is, is output, while if the same is "1", the value converted to "Dmax" is output as a signal 220. The value 210 and the values 220 are input to a calculator 13. In this calculator 13, the difference between these two signals is calculated and its result is output as a signal 230 ($\Delta E_{ij}$). This signal 230 is input to an weighing circuit 14, wherein an weighing ($a_{k1}$) is performed. Next, it is added to an error upon the picture element at a predetermined position in the error buffer. FIG. 4 illustrates an example of weighing coefficients ($a_{k1}$), wherein the symbol * corresponds to the position of the subject picture element (I, J). By repeating the above-described operation, the binarization with the error diffusion method is performed. In this embodiment, since the corrected signal 100 is treated in an 8 bits manner:

$$Dmax-255$$

However, if the corrected signal 100 is treated in an m bits manner:

$$Dmax-2^{m-1}+2^{m-2}+2\,2\ldots+2^0$$

Figure 5:
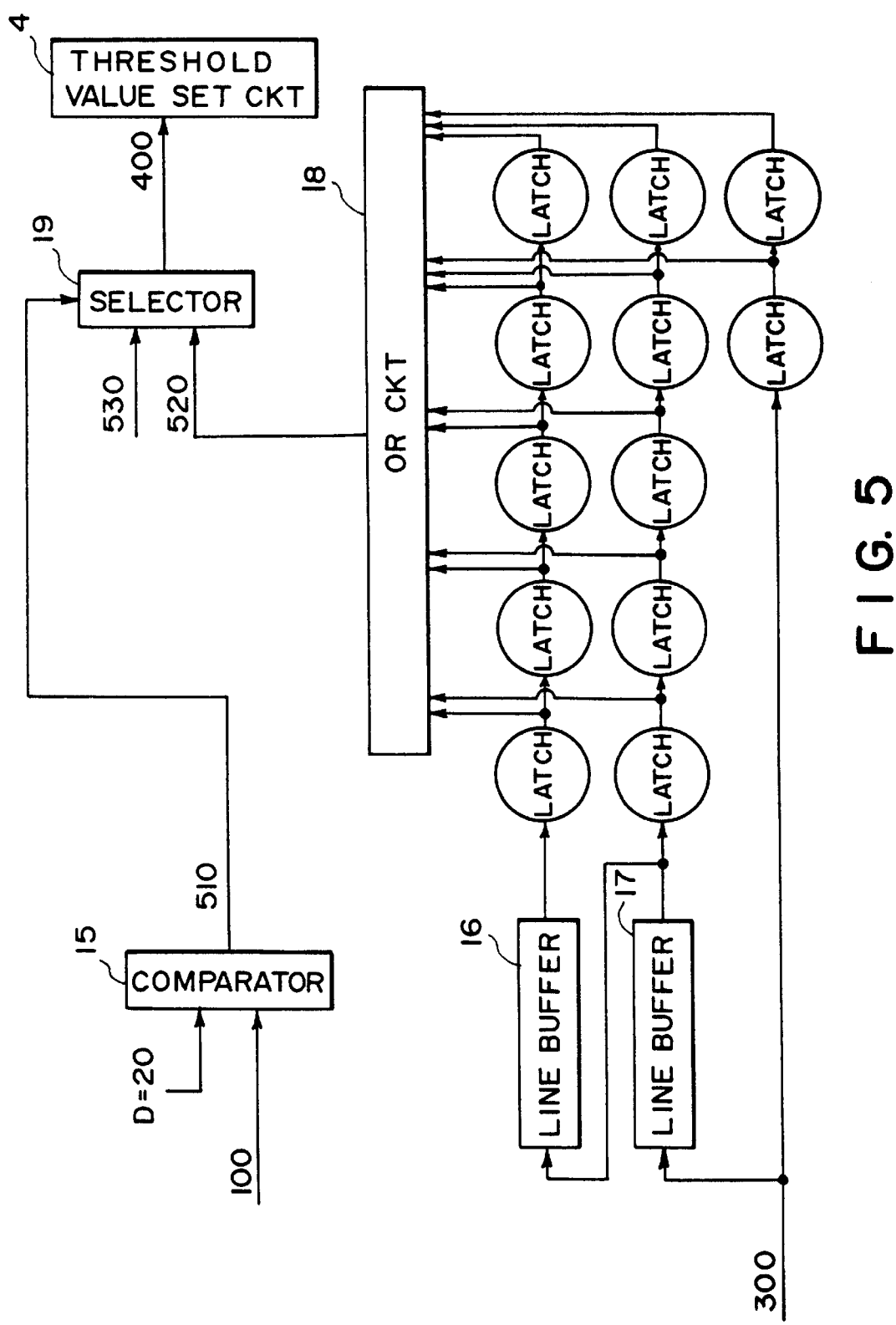
FIG. 5 is a block diagram illustrating in detail a judgment circuit 6.

FIG. 5 illustrates in detail a block diagram for use as the judgment circuit 6.

The binary signal 300 output from the binarization circuit 5 is latched immediately when the same is input to a line buffer 17. The signal read out from the line buffer 17 is also latched immediately when the same is input to a line buffer 16. That is, assuming that the position of the subject picture element to be now treated is (I, J), the binarized data picture elements at 12 peripheral positions are latched, the 12 positions being (I−2, J−2), (I−1, J−2), (I, J−2), (I+1, J−2), (I+2, J−2), (I−2, J−1), (I−1, J−1), (I, J−1), (I+1, J−1), (I+2, J−1), (I−2, J), and (I−1, J). The thus-latched data for the 12 picture elements are input to the OR circuit 18, wherein the 'OR' of the data for the 12 picture elements are calculated, and the results are output as a signal 520.

The corrected signal 100 is input to the comparator 15 wherein it is compared with the threshold D=20, wherein if the signal 100 is greater than the threshold D, "1" is, while the same is smaller than the threshold D, "0", is output as a signal 510.

As a result of this, the density of the image can be determined.

A selector 19, in accordance with the value of the signal 510, outputs a signal 520 if the signal 510 is "0", while the same outputs a signal 530 if the signal 510 is "1" as a signal 400. However, the value of the signal 530 is "0".

That is, in a case where the picture element whose density of the image is in a low level, the binarized data in the periphery portion of the subject picture element is examined, and if there is a signal for making the dot turn on, the signal 520 becomes "1". Furthermore, since the threshold T1=300 is selected in the threshold setting circuit, the dot of the subject picture element necessarily is turned off. In this state, if there is no signal which makes the dot turn in the periphery portion of the subject picture element, the signal 520 becomes "0". Therefore, the threshold T2=127 is selected in the threshold value setting circuit 4 so that the binarization treatment is performed.

In a case where the picture element whose density of image is high, since the signal 530 is selected by the selector 19, the threshold T2=127 is selected in the threshold setting circuit 4 so that the binarization treatment is performed.

As a of the examination of the binarized data in the peripheral portion of the subject element with the structure described above, if there is a dot in the periphery, in a portion whose density of image is low, the dot is forcedly turned off. Consequently, a phenomenon that dots are printed in closely positioned manner can be prevented.

Figure 6:
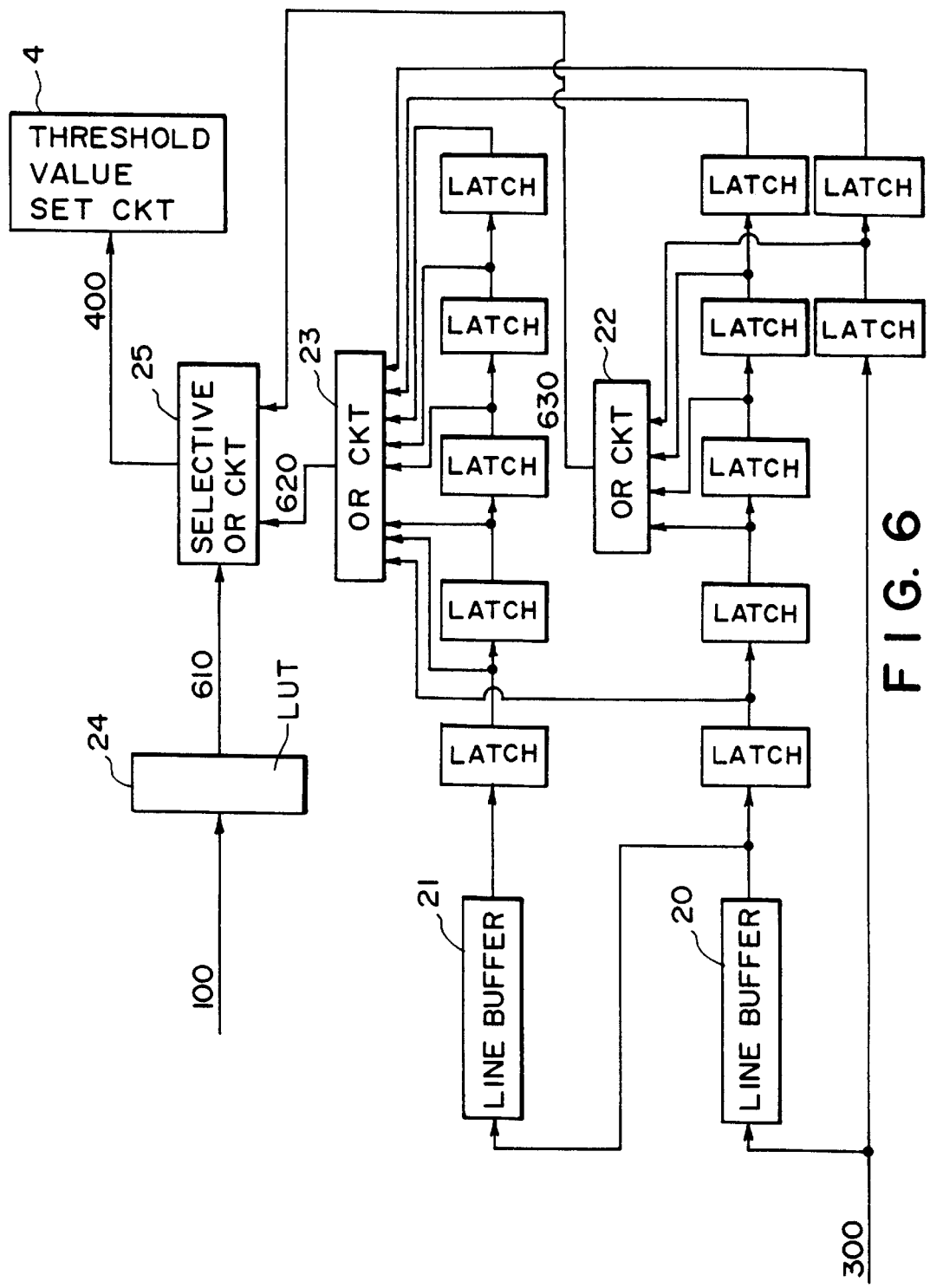
FIG. 6 is a block diagram in a case where the judgment circuit 6 is changed.

FIG. 6 is a block diagram illustrating a case where the judgment circuit 5 described in the aforesaid embodiment is changed.

The binarization signal 300 is latched immediately when the same is input to a line buffer 20. The signal read out from the line buffer 20 is also immediately latched when the same is input to a line buffer 21. That is, assuming that the position of the subject picture element to be now treated is (I, J), the binarized data picture elements at 12 peripheral positions are latched, the 12 positions being (I−2, J−2), (I−1, J−2), (I, J−2), (I+1, J−2), (I+2, J−2), (I−2, J−1), (I−1, J−1), (I, J−1), (I+1, J−1), (I+2, J−1), (I−2, J), and (I−1, J).

In an OR circuit 22, the 'OR' of the binarized data for 4 picture elements at the positions of the picture elements (I−1, J−1), (I, J−1), (I+1, J−1), and (I−1, J) are calculated, and as a result of this, a signal 630 is output.

In an OR circuit 23, the 'OR' of the binarized data for 8 picture elements at the positions of the picture elements (I−2, J−2), (I−1, J−2), (I, J−2), (I+1, J−2), (I+2, J−2), (I−2, J−1), (I+2, J−1), and (I−2, J) are calculated, and as a result of this, a signal 620 is output.

In an LUT 24, a switch signal 610 set in three levels corresponding to the input corrected signal 100 is output. The switch signal 610 is set to "1" when the corrected signal 100 is 20 or less, is set to "2" when the same is 21 or more and 50 or less, and is set to "0" when the same is 51 or more.

A selective OR circuit 25 outputs, in response to a selection signal 610 output from the LUT 24, "0" as a judgment signal 400 when the selection signal 610 is "0", outputs the 'OR' of the signal 620 and the signal 630 when the same is "1", and outputs the signal 630 when the same is "2". For example, the corrected signal 100 is 18, the switch signal 610 become "1", and in the state if the signal 620 is "1" and the signal 630 is "0", the judgement signal 400 becomes "1".

In this embodiment, the region to be made a reference with respect to the value of the corrected signal 100 is set to three stages (that is, the three stages that the periphery of the subject picture element is not examined, that the peripheral four picture elements are examined, and that the peripheral 12 picture elements are examined). As a result of this, since the range of peripheral regions to be examined is enlarged as the density of the image becomes lower, the dots can be diffused in accordance with the density. As a result of this, closely positioned printing of dots performed in the portion whose density is low can be prevented.

By increase in the number of the line buffers, the latches and the OR circuits at need, the regions to be made the reference can be made a multistage. An example in which the region is set to four stages will now be described.

It is assumed that the position of the subject picture element to be now treated is (I, J) and there are line buffers and latches needed for maintaining the binarized data for picture elements at 24 positions, the 24 positions being: (I−3, J−3), (I−2, J−3), (I−1, J−3), (I, J−3), (I+1, J−3), (I+2, J−3), (I+3, J−3), (I−3, J−2), (I−2, J−2), (I−1, J−2), (I, J−2), (I+1, J−2), (I+2, J−2), (I+3, J−2), (I−3, J−1), (I−2, J−1), (I−1, J−1), (I, J−1), (I+1, J−1), (I+2, J−1), (I+3, J−1), (I−3, J), (I−2, J), and (I−1, J).

Furthermore, it is assumed that three OR circuits (a, b, c) and one selective OR circuit (d) are included. In the OR circuit a, the 'OR' of the binarized data upon four picture elements at the positions (I−1, J−1), (I, J−1), (I+1, J−1), and (I−1, J) are calculated. As a result of this, a signal e is output. In the OR circuit b, the 'OR' of the binarized data upon the eight picture elements at the positions (I−2, J−2), (I−1, J−2), (I, J−2), (I+1, J−2), (I+2, J−2), (I−2, J−1), (I+2, J−1), and (I–2, J) are calculated. As a result of this, a signal f is output. In the OR circuit c, the 'OR' of the binarized data upon 12 picture elements at the positions (I–3, J–3), (I–2, J–3), (I–1, J–3), (I, J–3), (I+1, J–3), (I+2, J–3), (I+3, J–3), (I–3, J–2), (I+3, J–2), (I–3, J–1), (I+3, J–1), and (I–3, J). As a result of this, a signal g is output. In the selective OR circuit d: if the corrected signal 100 is 10 or less, the result of the 'OR' of the signal e, the signal f, and the signal g; if the corrected signal 100 is 11 or more and simultaneously 20 or less, the result of the 'OR' of the signal e and the signal f; if the corrected signal 100 is 21 or more and 50 or less, the result of the 'OR' of the signal e; and if the corrected signal 100 is 51 or more, "0", may be output as the judgment signal. In this embodiment the level of the corrected signal 100 is set to four stage; 10 or less, 11 or more and 20 or less, 21 or more and 50 or less, and 51 or more. However, this is described only as an example.

Furthermore, in a case where the color image, it can be realized in such a manner that a predetermined number of the circuits described in this embodiment may be provided corresponding to the number of the colors.

Figure 7:
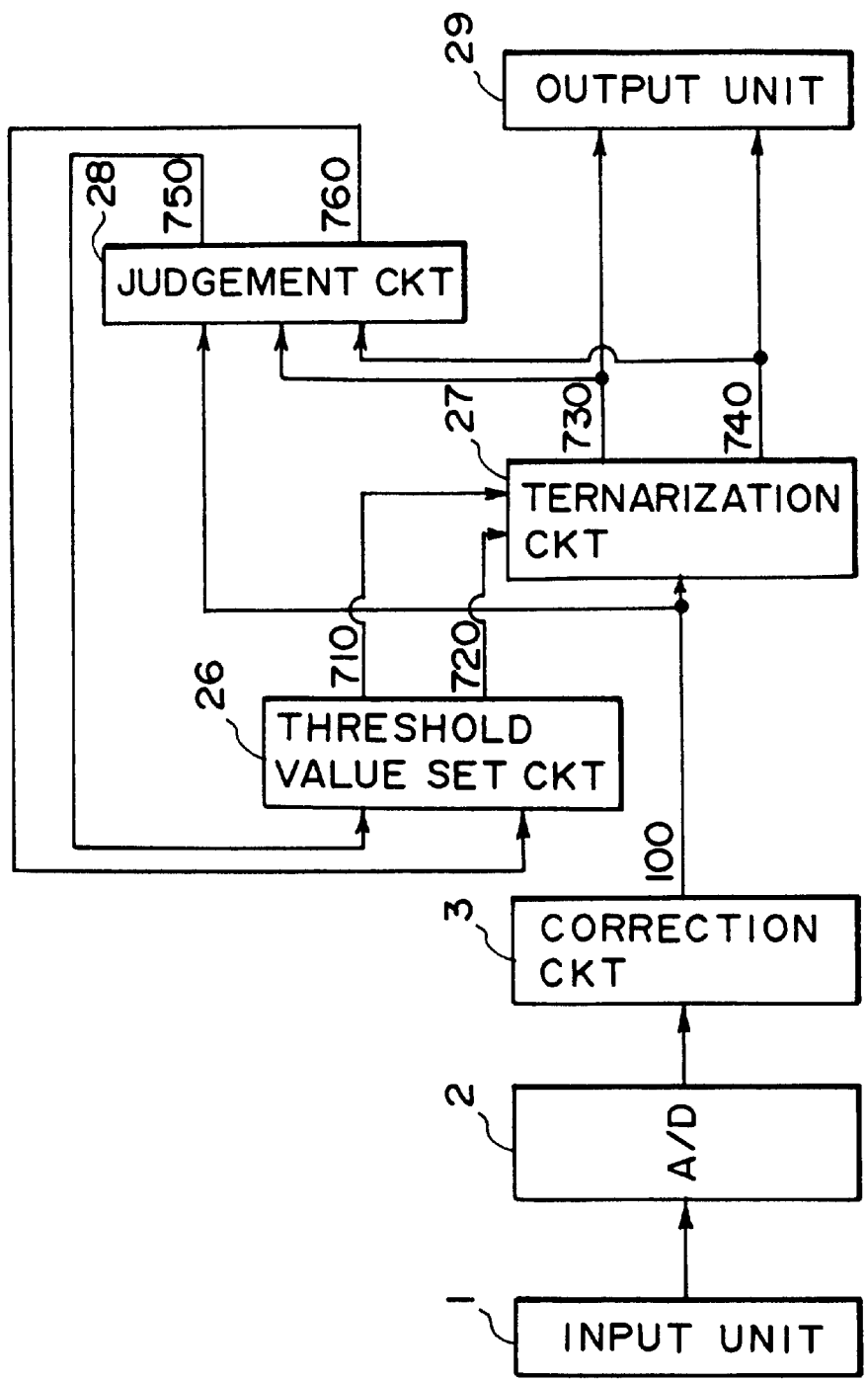
FIG. 7 is a block diagram for use in a case where the present invention is applied to a multi-value treatment.

FIG. 7 is a block diagram in a case where the embodiment shown in FIG. 1 is applied to a ternarization treatment.

The input sensor 1, the A/D converter 2, and the correction circuit 3 are the same as those shown in FIG. 1. The corrected signal 100 is input to a ternarization circuit 27 and a judgment circuit 28.

In a threshold value setting circuit 26, a threshold for ternarization is set by judgment signal 750 760 output from the judgment circuit 28. For example, if the judgment signal 750 is "0", 80 is output, while if the same is "1", 160 is output as a threshold signal 710. If the judgment signal 760 is "0", 160 is output, while if the same is "1", 300 is output as a threshold signal 720. This threshold value setting circuit 26 can be realized by two circuits such as that shown in FIG. 2.

In the ternarization circuit 27, the corrected signal 100 output from the correction circuit 3 is ternarized by the threshold signals 710 and 720 output from the threshold value setting circuit 26 so that signals 730 and 740 are output. For example, if the signal 100 is smaller than the signal 710, both signals 730 and 740 are set to "0", and if the signal 100 is greater than the signal 710 and smaller than the signal 720, the signal 730 is set to "1". Furthermore, if the signal 100 is greater than the signal 720, the signal 710 is set to "0", and the signal 740 is set to "1". The ternarization treatment in this state is performed with an error diffusion method in which the difference between the density of the output image and that of the input image is diffused to the peripheral picture elements.

The judgment circuit 28 can be realized by two of the circuits shown in FIG. 5 or FIG. 6. In this state, by the signal output from the ternarization circuit 27 and the corrected signal 100 output from the correction circuit 3, the ternarized region in the periphery of the subject picture element to be ternarized is made reference, and whether there is a printed dot in this region or not is judged. As a result of this, judgment signal 750 and 760 are output. For example, if the signal 100 is 20 or less, the presence of the dot in the treated region in the periphery of the subject picture element is examined in the circuit to which the signal 730 is input. The result of this is output as the signal 750. In this state, the signal 760 becomes "0". If the signal 100 is 128 or more and 150 or less, the presence of the dot in the treated region in the periphery of the subject picture element is examined in the circuit to which the signal 740 is input. The result of this is output as the signal 760. In this state, the signal 750 becomes "0". If the signal 100 is 21 or more and less than 128, or the same is 150 or more, both signals 750 and 760 become "0".

An outputting device 29 comprises a laser beam printer or an ink jet printer, wherein an image formation is performed by the signal 730 and 740 output from the ternarization circuit 27.

Although the ternarization circuit is described in this embodiment, if (N–1) of the threshold value setting circuit shown in FIG. 2 and the same number of the judgment circuit shown in FIG. 6 are used, the present invention can be applied to an N-value treatment.

A color image can be realized by providing the circuits shown in the above-described embodiments in numbers corresponding to the predetermined number of colors.

As described above, according to this embodiment, the presence of the dot in the periphery of the subject picture element is determined at the time of performing N-value treatment so that the binarization (N-value) treatment is performed. As a result of this, the problem experienced with the error diffusion method, the close positioned printing of dots, can be prevented.

Furthermore, by changing the binarized regions to be made the reference in accordance with the density of the images, dots can be printed in accordance with the density of the image so that the quality of the image can be improved.

Furthermore, according to the present invention, the white noise generated due to the fact that no dot is printed in the region in which the density of the image is high, can be prevented. In this case, the structure may be constituted in such manner that a dot is arranged to be printed in the subject picture element if a dot is not printed in the referential region, while if dots are completely printed, it is binarized at the usual threshold.

As described above, according to the present invention, he presence of the dot printed in the treated region in the periphery of the subject picture element is determined and the subject picture element is quantized in accordance with the result of the judgment. Therefore, the phenomenon of closely positioned dots printed in the region in which the image density is low can be prevented. Consequently the quality of the image can be improved.

Next, as a second embodiment, an embodiment capable of, in addition to the effect obtained in the first embodiment, preventing blanking in which no dot is printed in the portions in which the image density is low will be described.
Second Embodiment According to the accompanying drawings, a second embodiment of the present invention will now be described.

Figure 8:
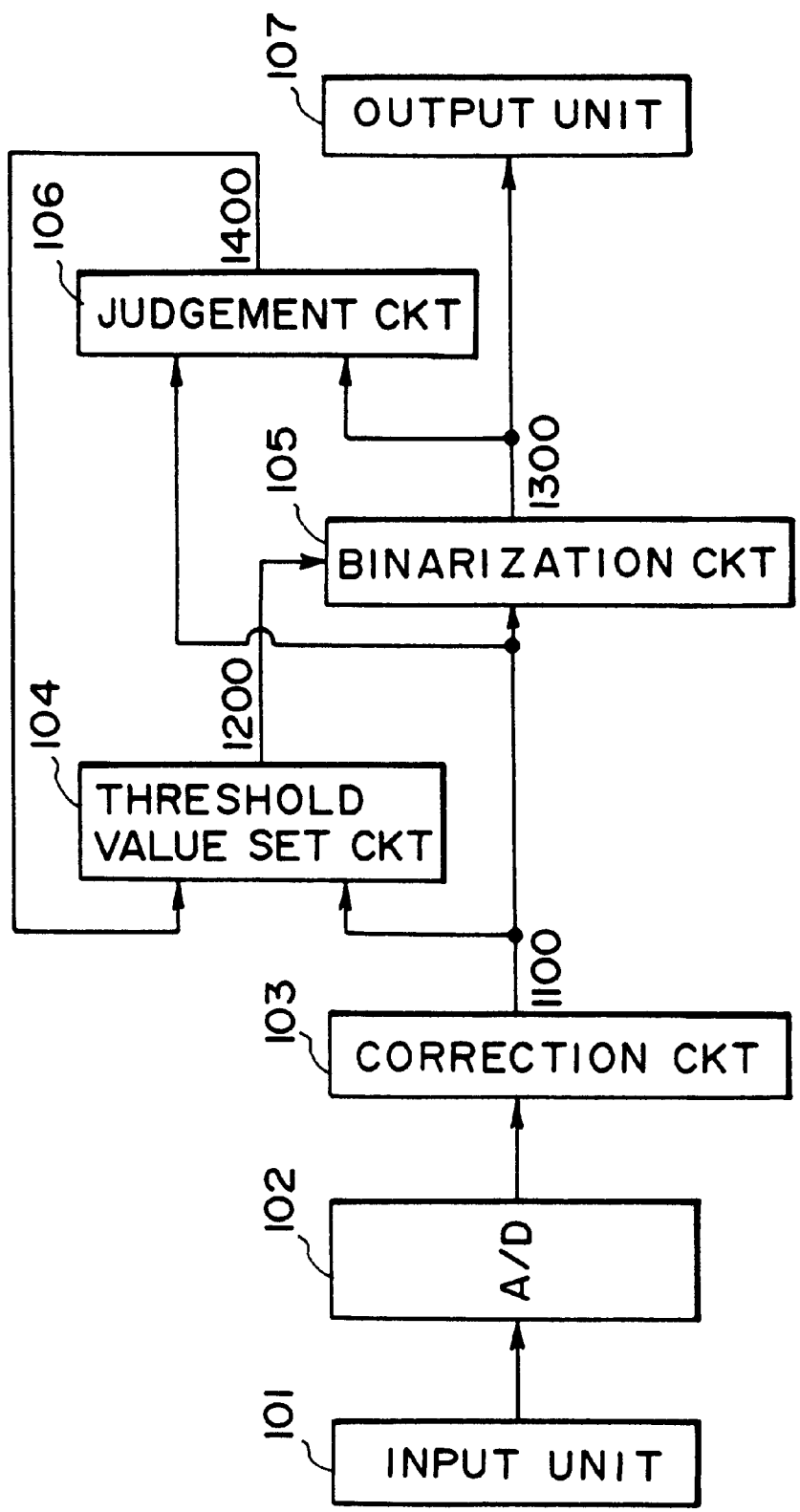
FIG. 8 is a block diagram according to a second embodiment of the present invention.

FIG. 8 is a block diagram for use in an image treatment device according to this embodiment.

Image data read out by an input device 101 comprising a photo-transducing element such as a CCD and a driving system for scanning the same are successively supplied to an A/D converter 102. In this A/D converter 102, data upon each of the picture elements are converted to, for example, digital data of 8 bits. As a result of this, the image data is quantized to 256-gradations data. Next, a correction such as shading correction for correcting for nonuniform sensitivity of the sensor of for nonuniform illuminance due to the power source for illumination is performed in a correction circuit 3 in a digital calculation treatment. Then, a signal 1100 which has been subjected to the above-described correction is input to a threshold value setting circuit 104, a binarization circuit 105 and a judgment circuit 106. In a threshold value setting circuit 104, the threshold for realizing the binarization is set in response to a judgment signal 1400 output from the judgment circuit 106 and the corrected signal 1100 output from the correction circuit 103 so that a threshold signal 1200 is output. In the binarization circuit 105, the corrected signal 1100 output from the correction circuit 103 is binarized by a threshold value signal 1200 output from the threshold value setting circuit 104 so that a binary signal 1300 is output therefrom. In the judgment circuit 106, by using the binary signal 1300 output from the binarization circuit 105 and the corrected signal 1100 output from the correction circuit 103, the binarized regions in the periphery of the subject picture element to be binarized are made a reference for the purpose of performing a determination whether there is a dot which has been turned on or not is made. As a result of this, a judgment signal 1400 is output. An output device 107 comprises a laser beam printer or ink jet printer and performing an image formation of the binary signal 1300 output from the binarization circuit 105 by way of turning on/off of the dots.

Figures 9A, 9B:
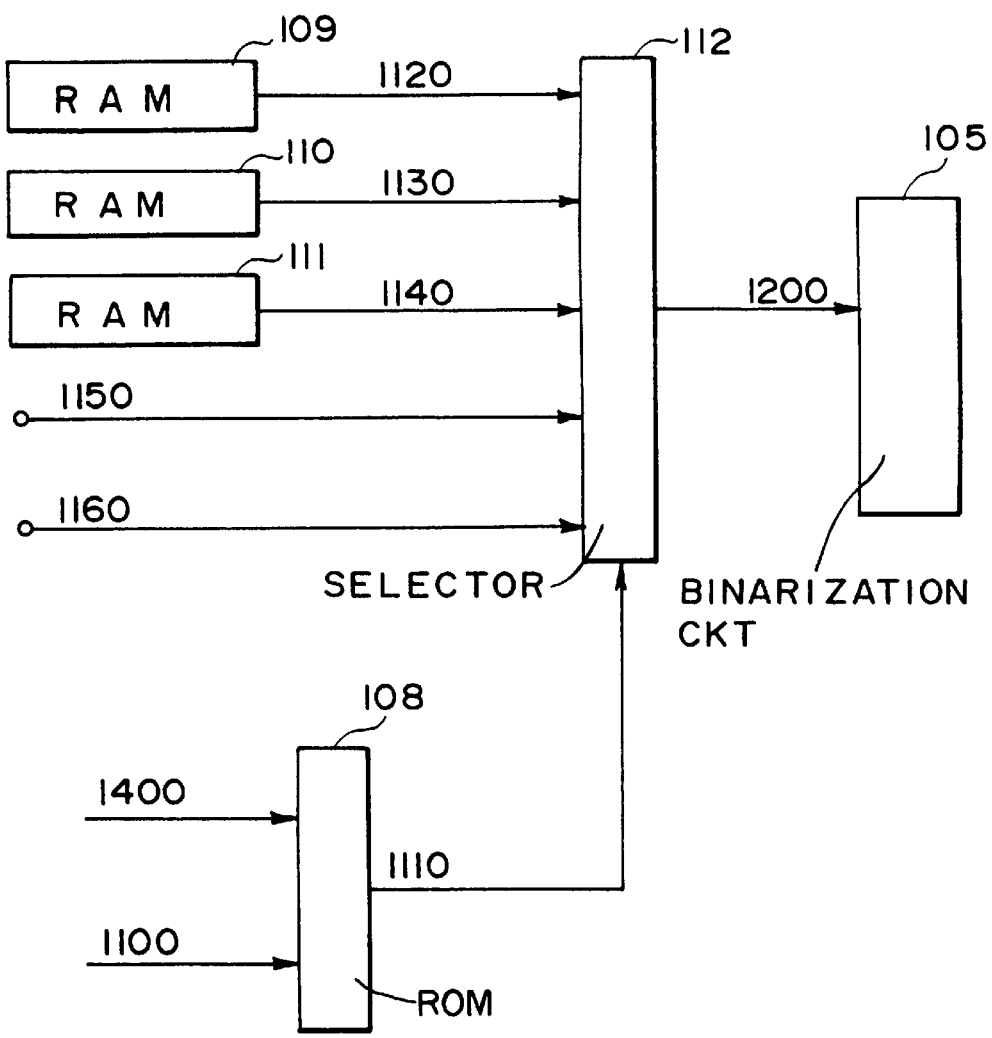
FIG. 9A is a block diagram illustrating in detail a threshold value setting circuit 104.
FIG. 9B is a view illustrating a ROM table stored in a ROM 108.

FIGS. 9A is a block diagram illustrating in detail the threshold value setting circuit 104.

The judgment signal 1400 output from the judgment circuit 106 and the corrected signal 1100 output from the correction circuit 103 are input to ROM 108. The ROM 108 outputs as a signal 1100: "0" when the judgment signal 1400 is "0" and the signal 110 is 1 more and less than 5; "1" when the judgment signal 1400 is "0" and the signal 1100 is 5 or more and less than 15; "2" when the judgment signal 1400 is "0" and the signal 1100 is 15 or more and less than 30; "3" when the judgment signal 1400 is "0" and the signal 1100 is 30 or more; and "4" regardless of the value of the signal 1100 when the judgment signal 1400 is "1".

FIG. 9B illustrates a ROM table stored in the ROM 108, wherein the above-described signal 1100 is accessed in accordance with the signal 1110 and the signal 1400.

The signal 1110 output from the ROM 108 is input to a selector 112 wherein, in accordance with the value of the signal 1110: when the signal 1110 is "0" a signal 1120 from RAM 109; when the signal 1110 is "1" a signal 1130 from a RAM 110; when the signals 1110 is "2" a signal 1140 from a RAM 111; when the signal 1110 is "3" a signal 1150; when the signal 1110 is "4" a signal 1160, is selected, and is output as a threshold signal 1200. In the RAM 109, a uniform random number column (integer) of 20 or more and 230 or less is stored, while in the RAM 110, a uniform random number column (integer) of 50 or more and 200 or less is stored, and while in the RAM 111, a uniform random number column (integer) of 100 or more and 150 or less is stored. In this state, the signal 1150 is arranged to be 127, while the signal 1160 is arranged to be 255.

The threshold stored in the RAM 109 is selected when the density of the signal 1100 is low. That is, since the threshold stored in the RAM 109 includes small valued ones, a dot can be output if the density of the signal 1100 is low.

The judgment signal 1400 is a signal representing whether the dot is present in the region in the peripheral portion of the binarized subject picture element. If this judgment signal 1400 is 1, a dot is present in the peripheral portion of the subject picture element. Therefore, the signal 1160 ("255") is selected as the threshold so as not to let any dot appear in the binarization of the subject picture element. The signal 1160 is, to be described later, selected only in the highlight portion of the image. Therefore, in the highlight portion of the image, successive printing of dots can be prevented.

In this embodiment shown in FIG. 9A, a three staged uniform random number column is used as the threshold by using three RAMs. However, the number of the RAM may be increased so as to use the multistage uniform random column. In this case, it is preferable to widen the region in which the random number is generated in the portions in which the density of the image is low, and the higher then density becomes, the narrower the region in which the random number is generated. The signal 1160 only needs to be a value above 255.

In the portion whose density is 0, in order to prevent generation of the dots, the stationary threshold (for example "127") is made the threshold signal 1200 if the density is 0.

As a result of this, the dot generated, for example, in the background of the characters can be prevented.

By lowering the threshold for binarization in a certain probability in the portion whose density is low level, the blanking in which no dot is printed and generated in the portion whose image density is low can be prevented. Furthermore, by controlling the size of the threshold in accordance with the image density, the deterioration in the character portion can be prevented and the smoothness of the image can be secured.

Furthermore, since a random number is used as the threshold, the uniforming of the portion whose image density is in an allowable level after the binarization an be improved.

Figure 10:
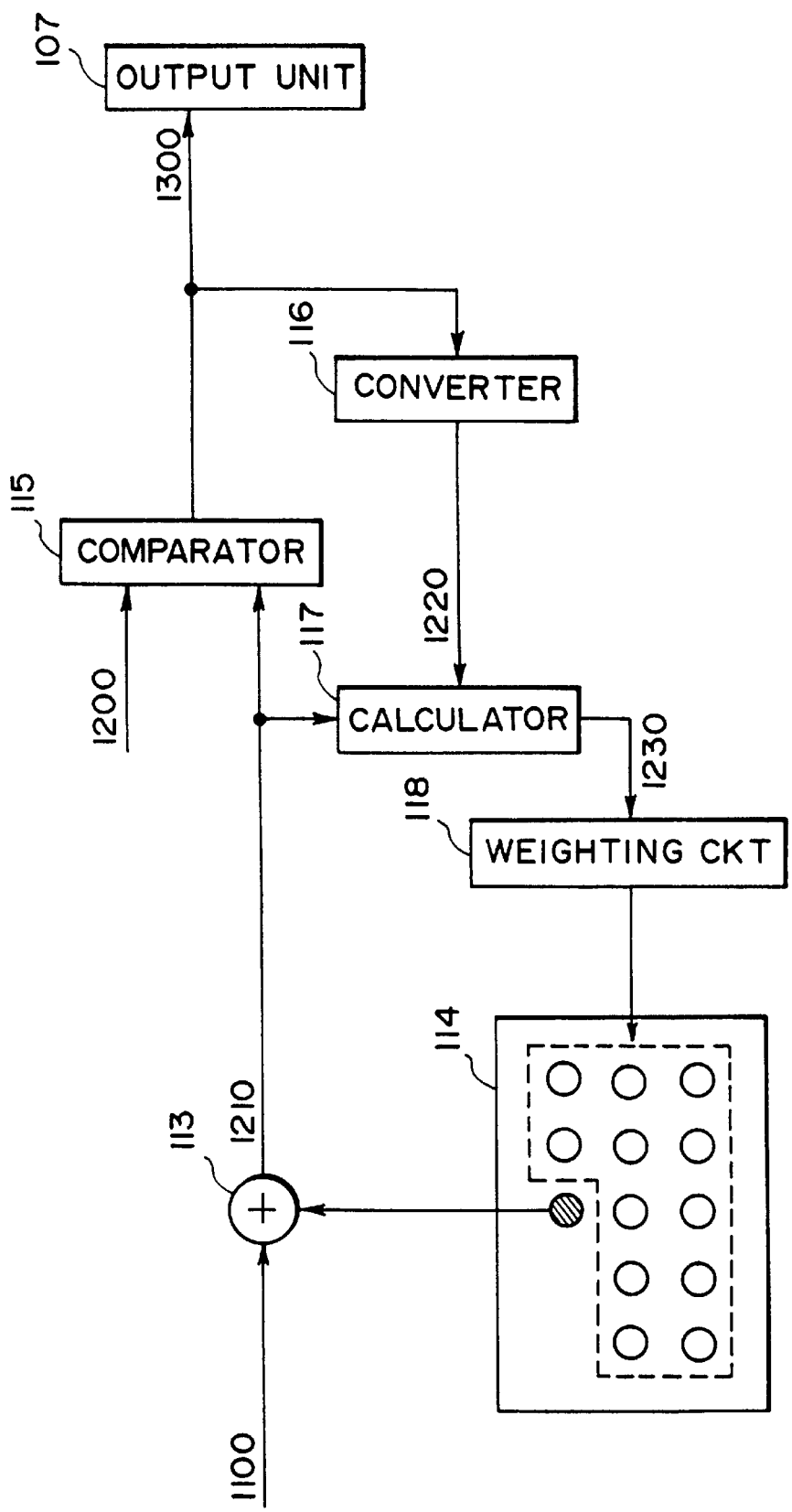
FIG. 10 is a block diagram illustrating in detail a binarization circuit 105.

FIG. 10 is a block diagram illustrating in detail the binarization circuit 5. The corrected signal 1100 (the density of the subject picture element) output from the correction circuit 3 is added to an error $E_{ij}$ (the total sum of the errors distributed to the subject picture elements) stored in an error buffer memory 114 by an adder 113. As a result, an error corrected signal 1210 is output.

Next, the error corrected signal 1210 is input to a comparator 115 wherein it is compared with a threshold signal 1200 output from the threshold value setting circuit 104. If the error corrected signal 1210 is greater than the threshold signal 1200, "1" is output, while if it is smaller than the same "0" is output as the binary signal 1300.

On the other hand, a converter 116 outputs the "0"as it is when the input binary signal 1300 is the same, while if it is "1", the value converted to "Dmax" is output as the signal 1220. The signal 1210 an the signal 1220 are input to a calculator 117, wherein the difference between the two signals is calculated and is output as a signal 1230 ($\Delta E_{ij}$). This signal 1230 is input to a weighting circuit 118 wherein weighting is performed. Next, it is added to the error at the picture element at a predetermined position in the error buffer. This weighting coefficient ($a_{k,1}$) is the same as that shown in FIG. 4. By repeating the above-described operation, the binarization with the error diffusion method is performed. In this embodiment, since the corrected signal 1100 is treated in an 8-bits manner:

Dmax=255

However, if the corrected signal 1100 is treated in an m bits manner:

Dmax=$2^{m-1}+2^{m-2}+2+\ldots+2^0$

Figure 11:
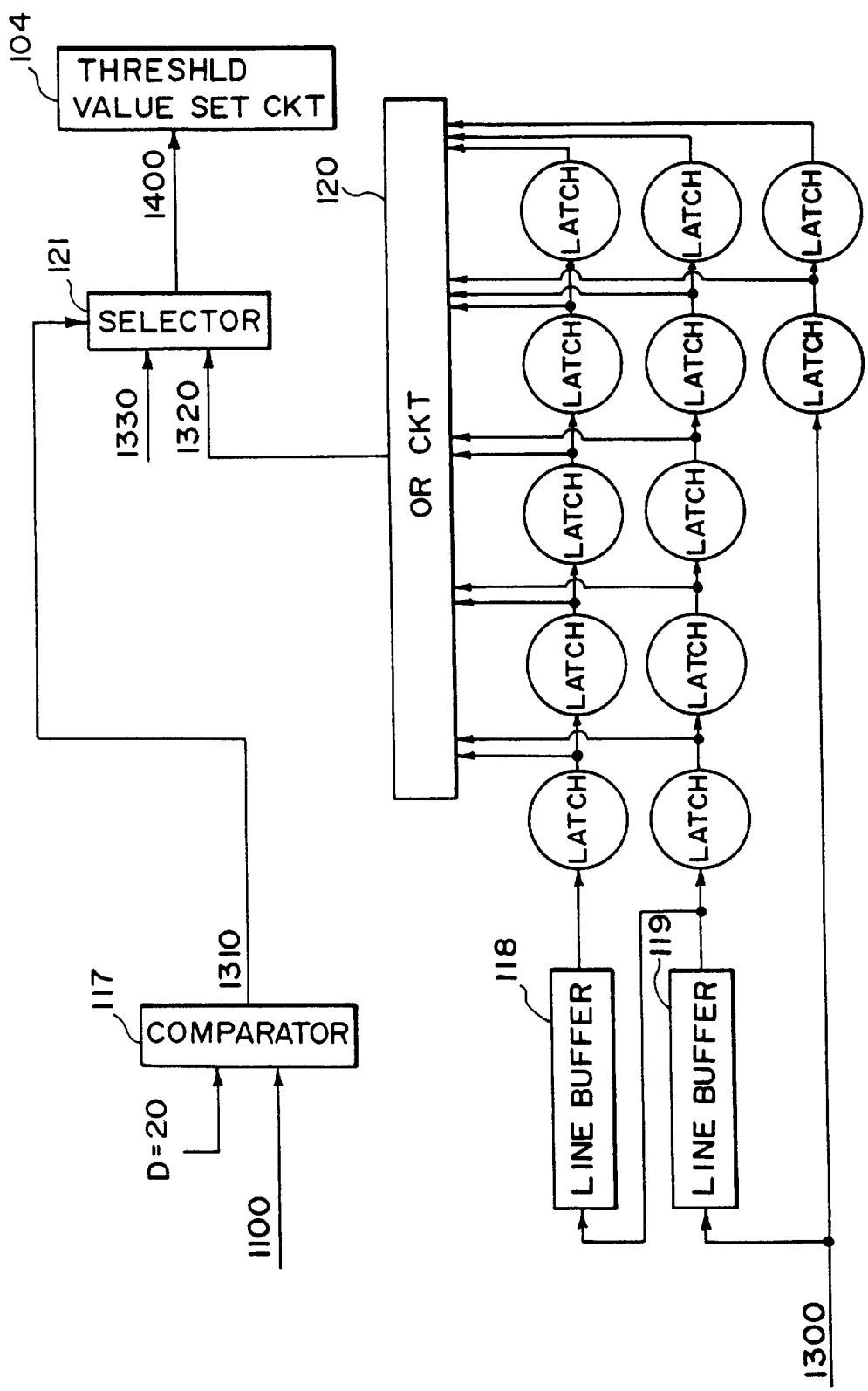
FIG. 11 is a block diagram illustrating in detail a judgment circuit 106.

FIG. 11 illustrates in detail a block diagram for use as a judgment circuit 106.

The binary signal 1300 output from the binarization circuit 5 is latched immediately when the same is input to a line buffer 1019. That is, assuming that the position of the subject picture element to be now treated is (I,J), the binarized data picture elements at 12 peripheral positions are latched, the 12 positions being (I−2, J−2), (I−1, J−2), (I, J−2), (I+1, J−2), (I+1, J−2), (I+2, J−2), (I−2, 5−1), (I−1, J–1), (I, J–1), (I+1, J–1), (I+2, J–1), (I–2, J), and (I–1, J). The thus-latched data for the 12 picture elements are input to the OR circuit 20, wherein the 'OR' of the data for the 112 picture elements are calculated, and the results are output as a signal 1320.

The corrected signal 1100 output from the correction circuit 103 is input to a comparator 117 wherein it is compared with the threshold D=20, wherein if the signal 1100 is greater than the threshold D, "1" is output, while if the same is smaller than the threshold D, "0", is output as a signal 1310.

As a result of this, the density of the image can be determined.

A selector 121, in accordance with the value of the signal 1310, outputs a signal 1320 if the signal 1310 is "0", while the same outputs a signal 1330 if the signal 1310 is "1" as a signal 1400. However, the value of the signal 1330 is "0".

That is, in a case where the picture element whose density of the image is low, the binarized data in the periphery portion of the subject picture element is examined, and if there is a signal for making the dot turn on, the signal 1320 becomes "1". As a result of this, the signal 1400 supplied to the threshold setting circuit 104 becomes "1". The threshold value setting circuit 4 selects as the threshold the signal 1160 (see FIG. 9A). As a result of this, the result of the binarization of the to the OR circuit 20, wherein the 'OR' of the data for the 112 picture elements are calculated, and the results are output as a signal 1320.

The corrected signal 1100 output from the correction circuit 103 is input to a comparator 117 wherein it is compared with the threshold D=20, wherein if the signal 1100 is greater than the threshold D, "1" is output, while if the same is smaller than the threshold D, "0" is output as a signal 1310.

As a result of this, the density of the image can be determined.

A selector 121, in accordance with the value of the signal 1310, outputs a signal 1320 if the signal 1310 is "0", while the same outputs a signal 1330 if the signal 1310 is "1" as a signal 1400. However, the value of the signal 1330 is "0".

That is, in a case where the picture element whose density of the image is a low, the binarized data in the periphery portion of the subject picture element is examined, and if there is a signal for making the dot turn on, the signal 1320 becomes "1". As a result of this, the signal 1400 supplied to the threshold setting circuit 104 becomes "1". The threshold value setting circuit 4 selects as the threshold the signal 1160 (See FIG. 9A). As a result of this, the result of the binarization of the subject picture element become 0, so that the appearance of extraneous dots can be prevented.

Furthermore, in this state, if there is no signal which can turn on the dot in the peripheral portion of the subject picture element, the signal 1320 become "0". Therefore, the threshold value setting circuit 104 selects any of the threshold signals 1120, 1130, 1140 and 1150 in accordance with the density of the subject picture element.

In a case of a picture element whose image density is in a high level, the signal 1330 is selected by the selector 121. Therefore, the threshold value setting circuit 104 selects any of the threshold signal 1120, 1130, 1140 and 1150 in accordance with the density of the subject picture element so that the binarization treatment is performed.

As a result of the above-described structure, no dot is printed in the peripheral portion of the area in which a dot is printed in the portion whose density is low.

Therefore, the dot blanking phenomenon in the portion whose picture density is low can be prevented. Furthermore, close positioned dot printing in the portion whose image density is in a low level can be prevented by examining the binarized data in the peripheral portion of the subject picture element.

Figure 12:
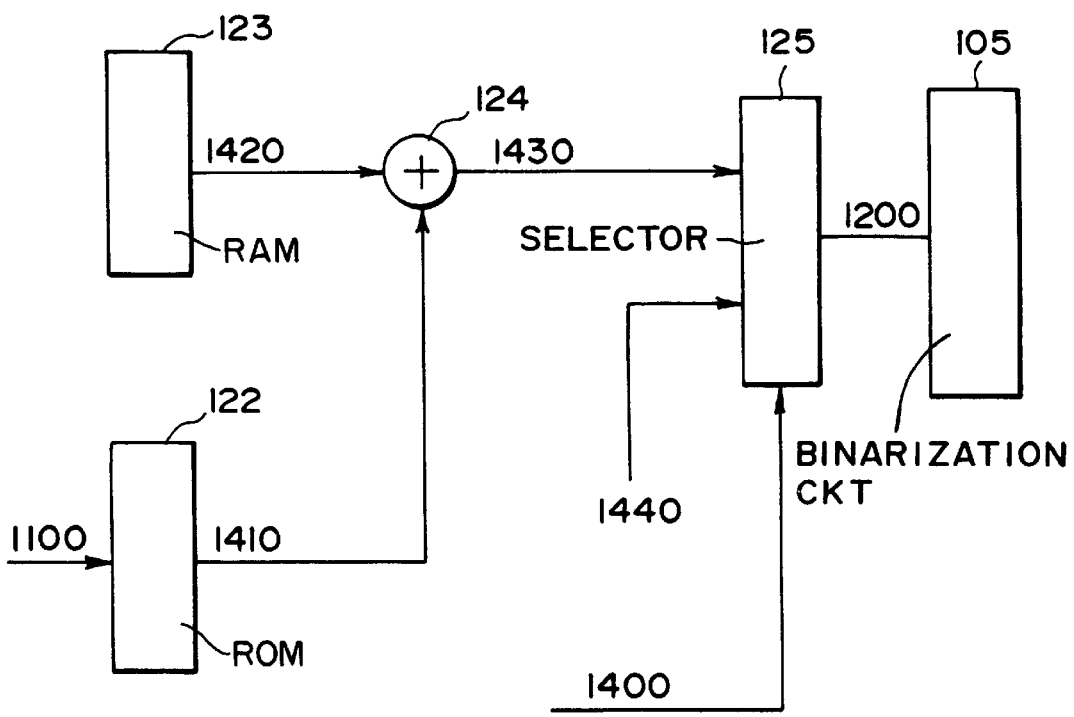
FIG. 12 is a block diagram illustrating a case where the threshold setting circuit 104 is changed.

FIG. 12 is a block diagram in which the threshold value setting circuit 104 described in the above-described embodiment is changed.

Figure 13:
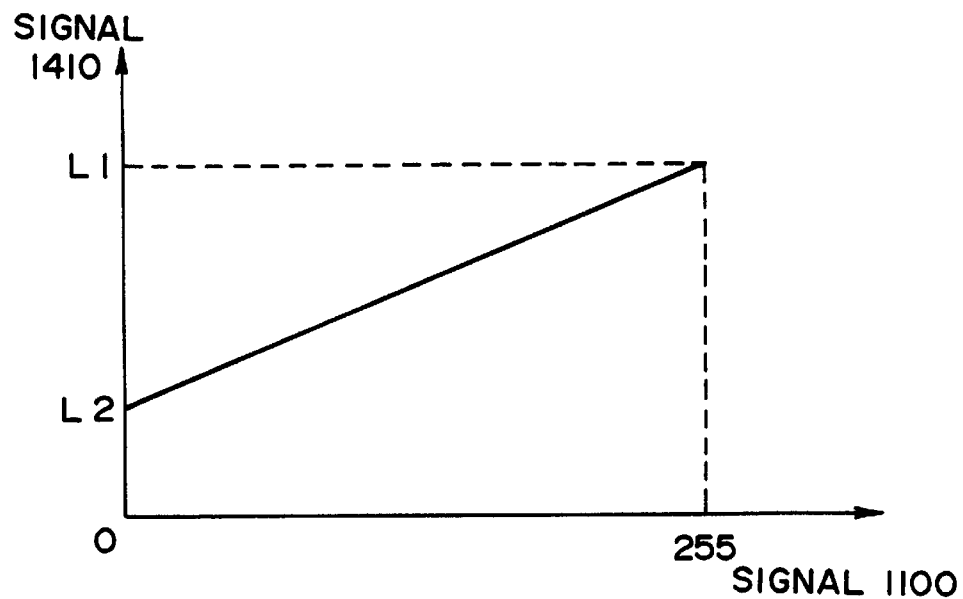
FIG. 13 illustrates the relationship between a signal 1100 and a signal 1410.

The signal 1100 output from the correction circuit 103 is input to a ROM 122. This ROM 122 outputs a signal 1410 in accordance with the following equation;

(signal 1410)=[(L1–L2)*(signal 1100)/255], wherein [ ] represents the Gaussian integer function. In this case, it is employed that L1="185" and L2="20". FIG. 13 illustrates the relationship between the signal 1100 and the signal 1410 only as an example. It is not limited to this, but need only satisfy the condition that when the signal 1100 is small, the signal 1410 is also small.

As for the L1 and L2, they are not limited to this description but need only satisfy the condition that L1>L2.

The RAM 123 stores a uniform random column which is 0 or more and L3 or less, but satisfying the relationship L3+L1<"255".

In the adder 24, the signal 1410 an the signal 1420 are added and the result is output as the signal 1430.

The selector 125 outputs, in accordance with the judgment signal 1400, a signal 1430 if the signal 1400 is "0", while if the signal 1400 is "1", it outputs a signal 1440, as a threshold signal 1200.

In this case, the signal 1400 is set to "255", however, it may be other values, and need only exceed "255".

As a result of the above-described structure, the function of setting the threshold is realized similarly to the above-described embodiments, and in addition, the size of the hardware can be reduced.

Figure 14:
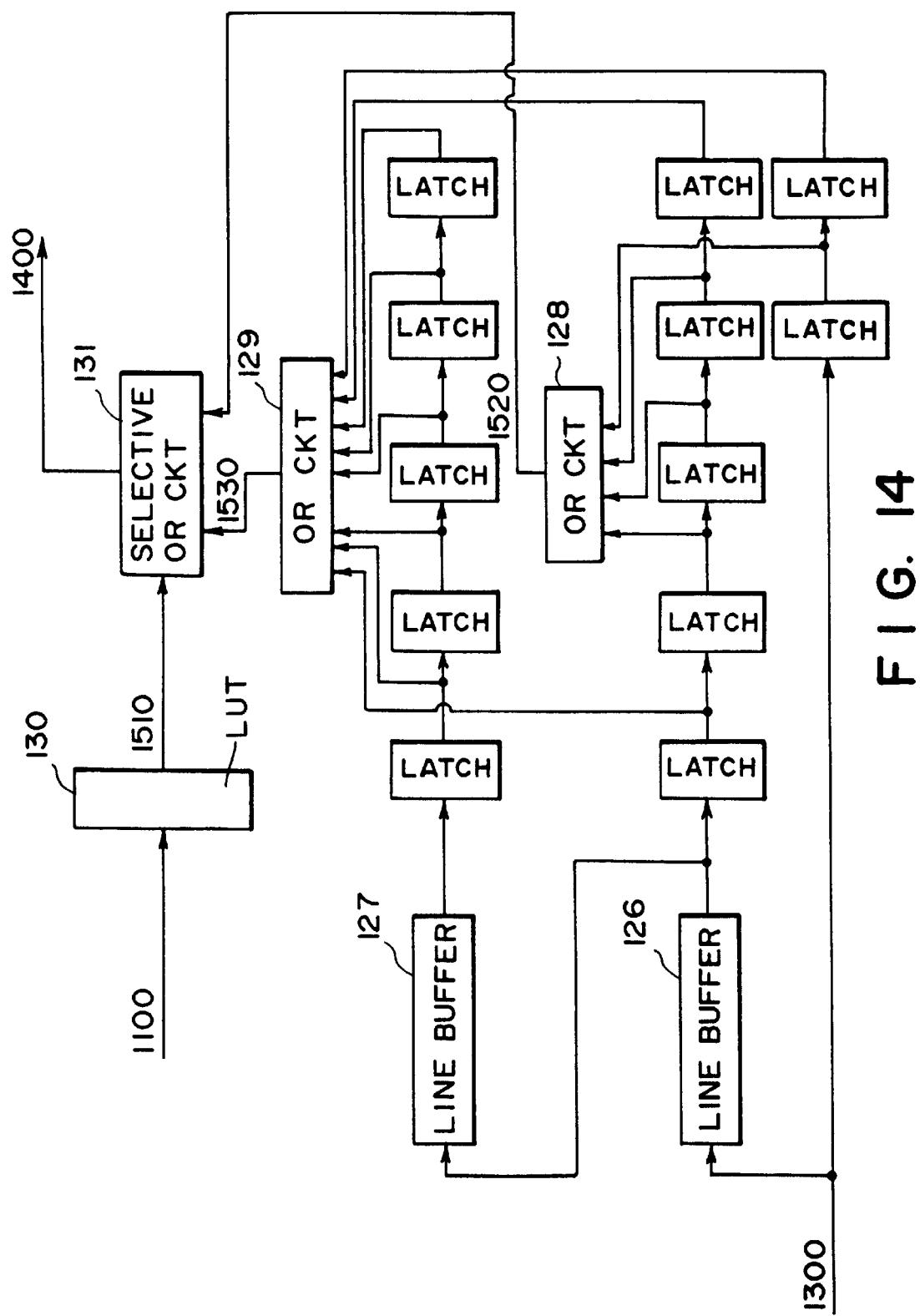
FIG. 14 is a block diagram used in a case where the judgment circuit 106 is changed.

FIG. 14 is a block diagram for use in a case where the judgment circuit 106 described in the above-described embodiment is changed.

The binarization signal 1300 is latched immediately when the same is input to a line buffer 126. The signal read out from the line buffer 126 is also immediately latched when the same is input to a line buffer 127. That is, assuming that the position of the subject picture element to be now treated is (I, J), the binarized data picture elements at 12 peripheral positions are latched, the 12 positions being (I–2, J–2), (I–1, J–2), (I, J–2), (I+1, J–2), (I+2, J–2), (I–2, J–1), (I–1, J–1), (I, J–1), (I+1, J–1), (I+2, J–1), (I–2, J), and (I–1, J).

In an OR circuit 128, the 'OR' of the binarized data for 4 picture elements at the positions of the picture elements (I–1, J–1), (I, J–1), (I+1, J–1), and (I–1, J) are calculated, and as a result of this, a signal 1520 is output.

In an OR circuit 129, the 'OR' of the binarized data for 8 picture elements at the positions of the picture elements (I–2, J–2), (I–1, J–2), (I, J–2), (I+1, J–2), (I+2, I–2), (I–2, J–1), (I–2, J–1) and (I–2, J) are calculated, and as a result of this, signal 1530 is output.

In a LUT 130, a switch signal 1510 set in three levels corresponding to the input corrected signal 1100 is output. The switch signal 1510 is set to "1" when the corrected signal 1100 is 20 or less, is set to "2" when the same is 21 or more and 50 or less, and is set to "0" when the same is 51 or more.

A selective OR circuit 131 outputs, in response to a selection signal 1510 output from the LUT 130, "0" as a judgment signal 1400 when the selection signal 1510 is "0", and outputs the "OR" of the signal 1520 and the signal 1530 when the same is "1", and outputs the signal 1520 when the same is "2". For example, if the corrected signal 1100 is 18, the switch signal 1510 becomes "1", and in this state if the signal 1520 is "1" and the signal 1530 is "0", the judgment signal 1400 becomes "1".

In this embodiment, the region to the made reference with respect to the value of the corrected signal 1100 is set to three stages (that is, the three stages that the periphery portion of the subject picture element is not examined, that the peripheral four picture elements are examined, and that the peripheral 12 picture elements are examined). As a result of this, since the range of periphery regions to be examined is enlarged as the lower the density of the image, the dots can be diffused in accordance with the density. As a result of this, the quality of the image can be improved.

By increase in the number of the line buffer, the latches and the OR circuits at need, the regions to be made reference can be made a multistage. An example in which the region is set for four stages will not be described.

It is assumed that the position of the subject picture element to be now treated is (I, J) and there are line buffers and latches needed for maintaining the binarized data for picture elements at 24 positions, the 24 positions being: (I−3, J−3), (I−2, J−3), (I−1, J−3), (I, J−3), (I+1, J−3), (I+2, J−3), (I+3, J−3), (I−3, J−2), (I−2, J−2), (I−1, J−2), (I, J−2), (I+1, J−2), (I+2, J−2), (I+3, J−2), (I−3, J−1), (I−2, J−1), (I−1, J−1), (I, J−1), (I+1, J−1), (I+2, J−1), (I+3, J−1), (I−3, J), (I−2, J), and (I−1, J).

Furthermore, it is assumed that three OR circuits a, b, c and one selective OR circuit d are included. In the OR circuit a, the 'OR' of the binarized data upon four picture elements at the positions (I−1, J−1), (I, J−1), (I+1, J−1), and (I−1, J) are calculated. As a result of this, a signal e is output. In the OR circuit b, the 'OR' of the binarized data upon the eight picture elements at the positions (I−2, J−2), (I−1, J−2), (I, J−2), (I+1, J−2), (I+2, J−2), (I−2, J−1), I+2, J−1), and (I−2, J) are calculated. As a result of this, a signal f is output. In the OR circuit c, the 'OR' of the binarized data upon 12 picture elements at the positions (I−3, J−3), (I−2, J−3), (I−1, J−3), I, J−3), (I+1, J−3), (I+2, J−3), (I+3, J−3), (I−3, J−2), (I+3, J−2), (I−3, J−1), (I+3, J−1), and (I−3, J). As a result of this, signal g is output. In the selective OR circuit d: if the corrected signal 1100 is 10 or less, the result of the 'OR' of the signal e, the signal f, and the signal g; if the corrected signal 1100 is 11 or more and simultaneously 20 or less, the result of the 'OR' of the signal e and the signal f; if the corrected signal 1100 is 21 or more and 50 or less, the result of the 'OR' of the signal e; and if the corrected signal 1100 if 51 or more, "0", may be output as the judgment signal. In this embodiment the level of the corrected signal 1100 is set to four stages; 10 or less, 11 or more and 20 or less, 21 or more and 50 or less, and 51 or more. However, this is described only as an example.

Furthermore, in a case of a color image, it can be realized in such a manner that a predetermined number of the circuits described in this embodiment may be provided corresponding to the number of the colors.

According to this embodiment, as described above, by lowering the threshold for b binarization in a certain probability in the portion whose density is in a low level, the blanking in which any dot is not printed and generated in the portion whose image density is in a low level can be prevented from generation.

Furthermore, by controlling the size of the threshold in accordance with the image density, the deterioration in the character portion can be prevented and the smoothness of the image can be also secured.

Furthermore, by not only lowering the threshold for binarization, but also quantizing the subject picture element in accordance with the result of judgment made upon whether there is a dot printed in the treated region in the periphery of the subject picture element or not. As a result of this, close printing the dots generated in a portion whose image density is in a low level can be prevented.

Furthermore, according to this embodiment, by enlarging the treated region to be made the reference as the density becomes lower, the dot can be printed in accordance with the image density. As a result of this, the quality of images can be improved.

Although in this embodiment, the structure is employed in which the blanking and a phenomenon that dots are closely printed in the portion whose density is low can be prevented, white noise generated due to non-printing of dots in the portion whose density is high can be also prevented.

In this case, by changing the threshold (random number) in accordance with density and employing an arrangement that a dot is inevitably printed if any dot is not printed in the region to be made reference in the periphery portion of a subject picture element, the dot may be printed or not in accordance with the threshold if all of the dots are printed.

In the above-described first and second embodiments, the examples are described in which input images are binarized and multivalued in the error diffusion method. However, the method of quantization according to the present invention is not limited to the error diffusion method. It can be used in a method of performing quantization by correcting the error between the input image and the output image, such as the average error minimum method.

We claim:

1. A method of producing a halftone image comprising the steps of:

scanning a plurality of input points of an original image and generating a numerical value representing a shade of gray for each input point scanned;

outputting a screened image having a plurality of dots, each dot of said plurality of dots being one of black or white, the size of each plurality of dots being determined from a recursive relationship between a value of a current input point, a previous output, and an error representing a difference between a value of a previous input point and the previous output; and transmitting signals representing the screened image to a marking device for marking on an output medium.

2. The method recited in claim 1 wherein the scanning is performed in two dimensions.

3. The method recited in claim 1 wherein the error is allocated in two dimensions.

4. The method recited in claim 3 wherein the error is allocated equally in each of the two dimensions.

5. The method recited in claim 1 wherein the black dots and white dots are produced by marking and not marking the medium, respectively.

6. An apparatus for producing a halftone image comprising:

means for scanning a plurality of input points of an original image and generating a numerical value representing a shade of gray for each input point scanned;

means for outputting a screened image having a plurality of dots, each dot of said plurality of dots being one of black or white, the size of each plurality of dots being determined from a recursive relationship between a value of a current input point, a previous output, and an error representing a difference between a value of a previous input point and the previous output; and means for transmitting signals representing the screened image to a marking device for marking on an output medium.

7. The apparatus recited in claim 6 wherein the scanning is performed in two dimensions.

8. The apparatus recited in claim 6 wherein the error is allocated in two dimensions.

9. The apparatus recited in claim 8 wherein the error is allocated equally in each of the two dimensions.

10. The apparatus recited in claim 6 wherein the black and white dots correspond to marking and not marking the output medium, respectively.

11. An image reproducing system, comprising:
   a) a scanning means for reading input image data corresponding to the image to be reproduced;
   b) a screening device comprising:
      memory means for storing image data representative of sequences of pluralities of input points and which contain information used to direct a marking device to mark or not mark indicia on a medium;
      means for generating signals allocating the marking and not marking of the indicia on the medium based on a value of a current input point in a sequence of input points, a previous output signal corresponding to a previous input point in the sequence and an error representing a difference between the previous input point and the corresponding output signals scaled relative to a maximum gray scale, the error influencing output signals for subsequent input points in the sequence; and
   c) a marking device to receive the output signals from the screening device, whereby the marking device marks variable size dots comprising indicia corresponding to said output signals.

12. The apparatus recited in claim 11 wherein the scanning device scans a plurality of lines corresponding to the image and the sequence corresponds to a plurality of points on at least one line.

13. The method recited in claim 1 wherein the recursive relationship employs a constant and a plurality of previous outputs, the constant and the plurality of previous outputs determining the coarseness of the screened image.

14. The method recited in claim 13 wherein the constant and the plurality of previous outputs define an allowable excursion of the error around zero.

15. The apparatus recited in claim 6 wherein the recursive relationship employs a constant and a plurality of previous outputs, the constant and the plurality of previous outputs determining the coarseness of the screened image.

16. The apparatus recited in claim 15 wherein the constant and the plurality of previous outputs define an allowable excursion of the error around zero.

17. An image reproducing system for generating on an output medium an image corresponding to an original image, the system comprising:
   a) a scanning means for reading input data of the original image to be reproduced, the scanning means generating signals representing gray scale values corresponding to each pixel of the original;
   b) a screening device comprising:
      memory means for storing the image data corresponding to each pixel and a plurality of output signals which direct a marking device to mark one of black or white indicia on the output medium for each output signal, each output signal corresponding to a pixel on the output medium; and
      means for generating signals allocating the black or white indicia on the output medium based on the gray scale value of a current gray scale signal, a previous output signal and an error signal representing a difference between prior gray scale signals and at least one previously generated output signal; and
   c) a marking device to receive the output signals from the screening device, the marking device thereby generating variable size dots comprising indicia corresponding to the output signals.

18. The apparatus recited in claim 17 wherein the black and white indicia correspond to marking and not marking of the output medium, respectively.

19. An image reproducing system, comprising:
   a) a scanning means for reading input image data corresponding to the image to be reproduced;
   b) a screening device comprising:
      memory means for storing image data representative of sequences of pluralities of input points and which contain information used to direct a marking device to mark or not mark indicia on a medium, and
      means for generating signals allocating the marking and not marking of the indicia on the medium, including means for generating variable size dots formed by a plurality of adjacent dots, the variable size of said plurality of adjacent dots being determined from a recursive relationship based on a value of a current input point in a sequence of input points, a previous output signal corresponding to a previous input point in the sequence and an error representing a difference between the previous input point and the corresponding output signals scaled relative to a maximum gray scale, the error influencing output signals for subsequent input points in the sequence; and
   c) a marking device to receive the output signals from the screening device, whereby the marking device marks variable size dots comprising indicia corresponding to said output signals.

20. An image reproducing system for generating on an output medium an image corresponding to an original image, the system comprising:
   a) a scanning means for reading input data of the original image to be reproduced, the scanning means generating signals representing gray scale values corresponding to each pixel of the original;
   b) a screening device comprising:
      memory means for storing the image data corresponding to each pixel and a plurality of output signals which direct a marking device to mark one of black or white indicia on the output medium for each output signal, each output signal corresponding to a pixel on the output medium, and
      means for generating signals allocating the black or white indicia on the output medium, including means for generating variable size dots formed by a plurality of adjacent dots, the variable size of said plurality of adjacent dots being determined from a recursive relationship based on the gray scale value of a current gray scale signal, a previous output signal and an error signal representing a difference between previous gray scale signals and at least one previously generated output signal; and
   c) a marking device to receive the output signals from the screening device, the marking device thereby generating variable size dots comprising indicia corresponding to the output signals.

21. An image reproducing system comprising:

a) a scanning means for reading input image data corresponding to the image to be reproduced;
b) a screening device comprising:
   memory means for storing image data representative of sequences of pluralities of input points and which contain information used to direct a marking device to mark or not mark indicia on a medium, and
   means for generating signals allocating the marking and not marking of the indicia on the medium based on a value of a current input point in a sequence of input points, a previous output signal corresponding to a previous input point in the sequence and an error representing a difference between the previous input points and the corresponding output signals scaled relative to a maximum gray scale, the error influencing output signals for subsequent input points in the sequence; and
c) a marking device to receive the output signals from the screening device, whereby the marking device marks variable size dots comprising indicia corresponding to said output signals,
   wherein said variable size dots are determined from a recursive relationship between said current input point in a sequence of input points, said previous output signal corresponding to a previous input point in the sequence and said error representing a difference between the previous input points and the corresponding output signals; and
   means responsive to a prior output signal corresponding to indicia of said halftone screen prior to said present output signal, and coupled to said means for generating signals to tend make said present output signal the same value as a prior adjacent output signal, thereby forming a variable size dot comprising a plurality of adjacent output signals having the same value.

* * * * *

UNITED STATES PATENT AND TRADEMARK OFFICE
CERTIFICATE OF CORRECTION

PATENT NO. : 6,285,464 B1
DATED : September 4, 2001
INVENTOR(S) : Akihiro Katayama et al.

It is certified that error appears in the above-identified patent and that said Letters Patent is hereby corrected as shown below:

Title page,
Item [56], References Cited, "Proceeings" should read -- Proceedings --; and "vol. 27.4," should read -- vol. 27/4, --.

Drawings,
Sheet 10 of 13, Figure 11, "THRESHLD" should read -- THRESHOLD --.

Column 1,
Line 17, "described, above" should read -- described above, --;
Line 33, "above" should read -- above- --; and
Line 41, "new" should read -- and --.

Column 4,
Line 62, "corrects" should read -- corrected --;
Line 63, "the" (first occurrence) should read -- if the --; and
Line 65, "on" should read -- ¶On --

Column 5,
Line 1, "values" should read -- value --;
Line 4, "an" should read -- a --;
Line 5, "an" should read -- a --;
Line 14, "Dmax-255" should read -- Dmax = 255 --;
Line 18, "Dmax-$2^{m-1}+2^{m-2}+22…+2^{0}$" should read -- Dmax = $2^{m-1}+2^{m-2}+… + 2+2^{0}$ --;
Line 37, "is, while" should read -- is output, while if --; and
Line 62, "a" should read -- a result --.

Column 7,
Line 15, "stage;" should read -- stages; --; and
Line 35, "that" should read -- those --.

Column 8,
Line 36, "he" should read -- the --.

Column 9,
Line 67, "RAM" should read -- RAMs --.

UNITED STATES PATENT AND TRADEMARK OFFICE
CERTIFICATE OF CORRECTION

PATENT NO. : 6,285,464 B1
DATED : September 4, 2001
INVENTOR(S) : Akihiro Katayama et al.

It is certified that error appears in the above-identified patent and that said Letters Patent is hereby corrected as shown below:

Column 10,
Line 4, "then" should read -- the --;
Line 23, "an" should read -- can --; and
Line 41, "an" should read -- and --.

Column 11,
Line 26, "of the to the" should read -- is supplied to the -- and "20" should be deleted; and
Line 60, "signal" should read -- signals --.

Column 12,
Line 24, "an" should read -- and --;
Line 55, "(I-2, J-1)" should read -- (I-1, J-1) --.

Column 13,
Line 14, "buffer," should read -- buffers, --;
Line 38, "I, J-3)," should read -- (I, J-3), --; and
Line 65, "be also" should read -- also be --.

Column 14,
Line 34, "outputting a screened image having a plurality of" should read -- forming a screened image by generating a plurality of variable size --;
Line 35, "dot of said plurality of" should read -- of said variable size dots being formed by a plurality of adjacent --;
Line 36, "dots" should read -- adjacent dots --;
Line 58, "outputting a screened image having" should read -- forming a screened image by generating --;
Line 59, "dots, each dot of said plurality of" should read -- variable size dots, each of said variable size dots being formed by a plurality of adjacent --; and
Line 60, "dots" should read -- adjacent dots --.

Column 15,
Line 17, "medium;" should read -- medium; and --.

UNITED STATES PATENT AND TRADEMARK OFFICE
CERTIFICATE OF CORRECTION

PATENT NO.    : 6,285,464 B1
DATED         : September 4, 2001
INVENTOR(S)   : Akihiro Katayama et al.

It is certified that error appears in the above-identified patent and that said Letters Patent is hereby corrected as shown below:

Column 16,
Line 8, "apparatus" should read -- system --;
Line 19, "medium," should read -- medium; --; and
Line 51, "medium," should read -- medium; --.

Column 17,
Line 7, "medium" should read -- medium; --.

Column 18,
Line 13, "to tend" should read -- tend to --.

Signed and Sealed this

Sixteenth Day of July, 2002

*Attest:*

JAMES E. ROGAN
*Attesting Officer*      *Director of the United States Patent and Trademark Office*